United States Patent [19]

Inaba et al.

[11] Patent Number: 4,968,239
[45] Date of Patent: Nov. 6, 1990

[54] DIRECT-PRESSURE TYPE MOLD CLAMPING MECHANISM

[75] Inventors: Yoshiharu Inaba, Kawaski; Fumio Mitoguchi, Hino; Hiromasa Yamashita, Takamatsu, all of Japan

[73] Assignee: Fanuc Ltd., Yamanashi, Japan

[21] Appl. No.: 167,854

[22] PCT Filed: Jun. 25, 1987

[86] PCT No.: PCT/JP87/00426

§ 371 Date: Feb. 17, 1988

§ 102(e) Date: Feb. 17, 1988

[87] PCT Pub. No.: WO88/00124

PCT Pub. Date: Jan. 14, 1988

[30] Foreign Application Priority Data

Jun. 30, 1986 [JP] Japan .................. 61-151522

[51] Int. Cl.$^5$ .............. B29C 33/22; B29C 45/66
[52] U.S. Cl. ................... 425/150; 74/89.15;
74/661; 100/273; 100/289; 425/419; 425/451.2;
425/451.7; 425/451.9; 425/590; 425/DIG. 223
[58] Field of Search .............. 425/150, 419, 450.1,
425/451, 451.2, 451.3, 451.7, 451.9, 589, 590,
595, 214, DIG. 223; 74/89.15, 324, 661, 665 B,
665 D; 100/269 R, 269 B, 273, 289

[56] References Cited

U.S. PATENT DOCUMENTS

| 298,226 | 5/1884 | O'Daniel | 100/273 |
| 951,300 | 3/1910 | Breihan | 100/273 |
| 1,243,223 | 10/1917 | Robson | 74/665 B |
| 1,832,960 | 11/1931 | Barrows et al. | 100/273 |
| 1,905,113 | 4/1933 | Lasker | 100/273 |
| 2,370,622 | 3/1945 | Gastrow | 425/451.7 |
| 3,063,708 | 11/1962 | Wollenhaupt | 269/216 |
| 3,104,433 | 9/1963 | Hoern | 164/312 |
| 3,720,296 | 3/1973 | Ohno | 74/661 |
| 3,797,623 | 3/1974 | Gregorovich et al. | 74/661 |
| 4,552,255 | 11/1985 | Sommer | 74/665 B |
| 4,696,632 | 9/1987 | Inaba | 425/590 |

FOREIGN PATENT DOCUMENTS 5113495 4/1976 Japan .

Primary Examiner—James C. Housel
Attorney, Agent, or Firm—Staas & Halsey

[57] ABSTRACT

A motor-operated, direct-pressure type mold clamping apparatus is capable of high-speed mold closing and opening operations and of producing a required mold clamping force, without the use of a large-sized motor. In the mold opening and closing operations, a ball screw, in engagement with a ball nut which is movable in one with a moving platen, is rotated at high speed by a motor through gears and a clutch, so that a die is opened and closed at high speed. In a mold clamping operation, the ball screw is driven with a large rotatory force transmitted through a clutch and gears which, having a high reduction ratio, serve to increase the rotatory force of the motor. Thus, dies are clamped with a large clamping force.

8 Claims, 2 Drawing Sheets

DIRECT-PRESSURE TYPE MOLD CLAMPING MECHANISM

BACKGROUND OF THE INVENTION

1. Field of the Invention

The present invention relates to a motor-operated, direct-pressure type mold clamping mechanism of an injection-molding machine.

2. Description of the Related Art

An injection-molding machine is furnished with a toggle type mold clamping mechanism, in which a drive source and a moving platen are connected by means of a toggle link, or a direct-pressure type mold clamping mechanism, in which the drive source and the moving platen are connected directly. The clamping mechanism serves to open or close and clamp dies that are attached individually to the moving platen and a stationary platen.

In the mold clamping operation, the dies must be clamped with a strong force. Thus, a requisite for the drive source of a mold clamping mechanism is to be capable of producing a strong clamping force. In the process of injection molding, moreover, the time required for the manufacture of each molding, i.e, the cycle time, is relatively short. Another requisite for the drive source, therefore, is to be able to drive the dies at high speed while they are being opened or closed.

The toggle link acts to help the dies open or close at high speed, and to facilitate the production of a strong clamping force. Thus, the toggle type mold clamping mechanism fulfills both of the aforesaid requirements. The direct-pressure type mold clamping mechanism, on the other hand, has the advantage over the toggle type mold clamping mechanism in that the former does not require mold thickness adjustment for compensating the change of the die thickness. It is difficult for the direct-pressure type mold clamping mechanism, however, to satisfy both the aforementioned requirements. In the case of a direct-pressure type mold clamping mechanism using a motor as its drive source, for example, both of the aforementioned requirements can be fulfilled only if the motor used has a very large capacity, since large capacity motor are expensive, the manufacturing cost of the injection-molding machine increases.

SUMMARY OF THE INVENTION

Accordingly, the object of the present invention is to provide a motor-operated, direct-pressure type mold clamping mechanism, capable of high-speed mold closing and opening operations and of producing a required mold clamping force, without the use of a special, large-capacity motor.

In order to achieve the above object, a direct-pressure type mold clamping mechanism according to the present invention comprises conversion means including a rotating member and a rectilinear motion member movable in unison with a moving platen, the conversion means serving to convert a rotary motion of the rotating member into a rectilinear motion of the rectilinear motion member; a motor for driving the rotating member of the conversion means; transmission means for transmitting the rotation of the motor to the rotating member, thereby rotating the rotating member at high speed; a speed reducer for reducing and enhancing the rotation speed and the rotatory force of the motor, respectively, and transmitting the rotatory force of the motor, thus enhanced, to the rotating member; and switching means for connecting the motor and the rotating member alternatively by means of the transmission means and the speed reducer.

According to the present invention, as described above, the moving platen is driven by means of the motor with the aid of the transmission means in a mold closing or opening step, which, although never necessitating production of a particularly strong driving force, requires the moving platen to move quickly. In a mold clamping step which, although requiring only low speed and small displacement, demands production of a strong clamping force, on the other hand, mold clamping operation is performed with use of a motor output enhanced by means of the speed reducer. Thus, the mold clamping can be effected without using a large-capacity motor, and the mold closing and opening operations can be accomplished in a short time. Accordingly, an economical injection-molding machine with a shorter required cycle time is obtained.

Moreover, the maximum output torque of the motor used need not be great. By limiting the torque of the motor output, dies are protected due to the small, optimum die protection force utilized.

DETAILED DESCRIPTION OF THE PREFERRED EMBODIMENTS

Figure 1:
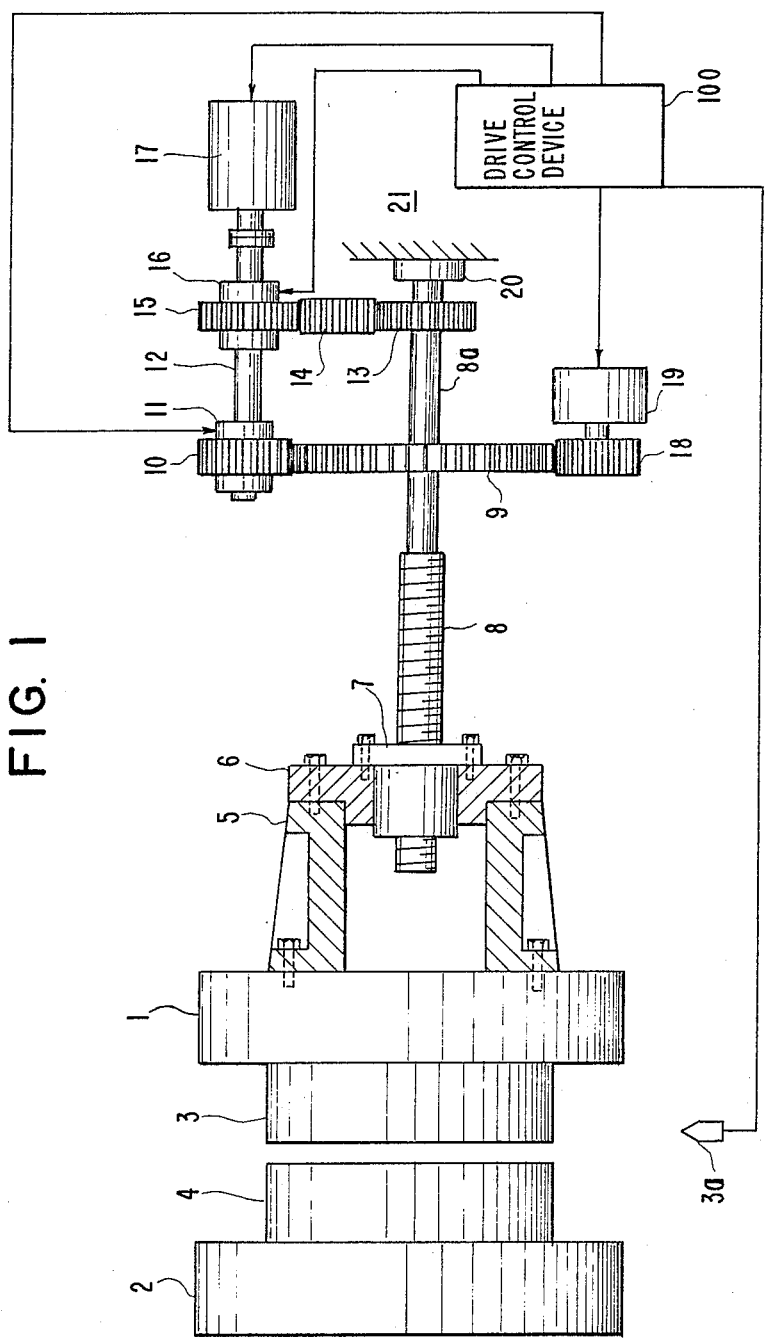
FIG. 1 is a schematic view substantially showing the a direct-pressure type mold clamping apparatus according to a first preferred embodiment of the present invention.

FIG. 1 shows a direct-pressure type mold clamping mechanism according to a preferred embodiment of the present invention. In FIG. 1, numerals 1 and 2 denote a moving platen and a stationary platen, respectively. These platens 1 and 2 are fitted with dies 3 and 4, respectively. The stationary platen 2 is fixed to a base 21 of an injection-molding machine, and the moving platen 1 can slide from side to side, as in FIG. 1, along a tie bar (not shown) extending between a rear platen (not shown), which is fixed to the base 21 of the injection-molding machine, and the stationary platen 2. Numeral 5 denotes a nut fixing base which is fixed to the moving platen 1 by means of bolts or the like. A nut mounting plate 6 is fixed to one end of the nut fixing base 5 by means of bolts or the like. Further, a ball nut 7 is fixed to the nut mounting plate 6 by means of bolts or the like. Elements 1 and 5 to 7 constitute an integral structure.

A ball screw 8, which mates with ball nut 7, is mounted so that its axis is substantially in alignment with the center of the moving platen 1. Namely, the ball screw 8 is positioned so that the dies 3 and 4 can be clamped evenly when the moving platen 1 is moved, through the medium of the ball nut 7, the nut mounting plate 6, and the nut fixing base 5. Axial movement of moving platen 1 is effected by rotating the ball screw 8.

A ball screw shaft 8a, which is integral with the ball screw 8, has one end rotatably supported at the base 21 (or a rear platen fixed thereto) of the injection-molding machine by means of a thrust bearing 20. Gears 9 and 13 are fixed to the ball screw shaft 8a, and a gear 10 meshes with the gear 9. The gear 10 is releasably coupled to a driving shaft 12 by means of an electromagnetic clutch 11. Moreover, the gear 13 meshes with an idler 14, which is in with a gear 15. The gear 15 is also releasably coupled to the driving shaft 12 by means of an electromagnetic clutch 16. The driving shaft 12 is connected to a motor 17. A braking system 19 is mounted on a shaft to which is connected a gear 18 meshing with the gear 9. The motor 17 and the braking system 19 are fixed to the base 21 of the injection-molding machine, and the idler 14 is supported by the base 21, although junctions between them are not illustrated.

In the present embodiment, the gears 9 and 10 constitute a speed reducer, which serves to reduce the rotation speed of the driving shaft 12 and transmit increased torque to the ball screw shaft 8a. On the other hand, the gear 13, the idler 14, and the gear 15 constitute transmission means for transmitting the rotation of the driving shaft 12 to the ball screw shaft 8a with a rotating speed ratio of 1:1.

In FIG. 1, numeral 100 denotes a device for controlling the drive of the clutches 11 and 16, the motor 17, and the braking system 19. A description of the device 100 is omitted herein, since this device can be constructed by a conventional technique.

A mold clamping apparatus according to the present embodiment will now be described.

First, in closing the dies 3 and 4, the clutch 11 is disengaged to disconnect the driving shaft 12 and the gear 10, while the clutch 16 is engaged to connect the driving shaft 12 and the gear 15. At the same time, the braking system 19 is released. When the motor 17 is rotated in the mold closing direction, the ball screw 8 is rotated at high speed by moment transmitted through the driving shaft 12, clutch 16, gear 15, idler 14, gear 13, and ball screw shaft 8a. Thereupon, the ball nut 7 in engagement with the ball screw 8 advances, thereby moving the die 3 in the mold closing direction (from right to left of FIG. 1), the die 3 being mounted on the moving platen 1 which is integral with the nut mounting plate 6 and the nut fixing base 5. When the die 3 reaches a die protection start position, the rotating speed of the motor 17 is reduced so that the die 3 is driven at a die protection speed.

When the die 3 reaches the position where it touches the die 4, the clutch 16 is disengaged to disconnect the driving shaft 12 and the gear 15, and the braking system 19 is actuated to lock and prevent the ball screw 8 from rotating further. Then, the clutch 11 is engaged to connect the driving shaft 12 and the gear 10, and the braking system 19 is released. By doing this, the rotation speed of the motor 17 is transmitted in a reduced mode to the ball screw shaft 8a, through the driving shaft 22, clutch 11, gear 10, and gear 9, so that the ball screw 8 is rotated at low speed. As the ball screw 8 rotates, the die 3 moves in the mold closing direction, as mentioned before, so that the dies 3 and 4 are clamped together. In doing this, the rotating speed and the rotatory force of the motor 17 are reduced and enhanced, respectively, by means of the gears 10 and 9, as a result, strong mold clamping force is produced. When a suitable sensor 3a detects an arrival of the die 3a at position which produces a set clamping force is, the braking system 19 is worked, the clutch 11 is disengaged, and the drive of the motor 17 is stopped.

When starting mold opening after the end of injection, hold or the like, the braking system 19 is released, the clutch 16 is engaged, and the motor 17 is rotated in a mold opening direction (reversely) at a mold release speed. Thus, the ball screw 8 is rotated reversely to the rotation for the mold closing through the medium of the clutch 16, driving shaft 12, gear 15, idler 14, gear 13, and ball screw shaft 8a. After the die 3 reaches an acceleration position, the rotation of the motor 17 is accelerated. When the die 3 then reaches a deceleration position, the speed of the motor 17 is reduced. When the die 3 reaches a mold opening end position, the motor 17 is stopped. Thus, one cycle of operation, including the steps of mold closing, mold clamping, and mold opening, is finished.

In the embodiment described above, the braking system 19 is designed so as to be able to lock the gear 18 in mesh with the gear 9. Alternatively, however, the brake system 19 may directly lock the ball screw shaft 8. Further, the clutch 11 need not always be located between the driving shaft 12 and the gear 10. For example, an alternative clutch, which replaces the clutch 11, may be provided between the gears 15 and 10 on the driving shaft 12, in a manner such that the gear 10 is fixed directly on one side of the driving shaft 12. Alternatively, instead of clutch 16, a clutch may be provided between the ball screw shaft 8a and the gear 13. In this case, the gear 15 is fixed directly on the driving shaft 12.

Moreover, the motor 17 may be formed of a servomotor. In this case, the brake 19 need not always be used, since the servomotor operates so as to hold the die 3 in position while switching from mold closing to mold clamping or during the mold clamping step.

Figure 2:
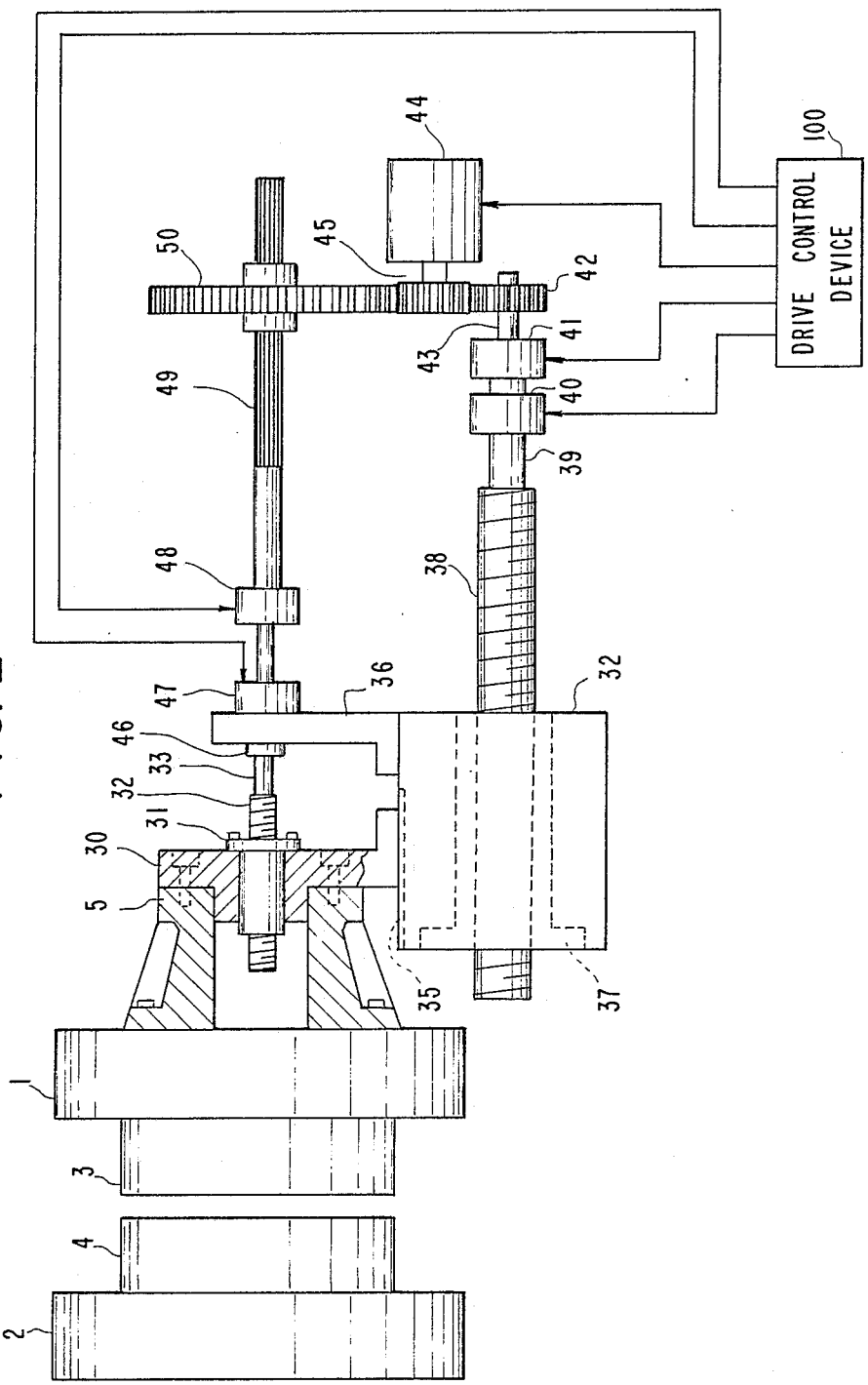
FIG. 2 is a schematic view showing an apparatus according to a second preferred embodiment of the present invention.

FIG. 2 shows a direct-pressure type mold clamping mechanism according to a second preferred embodiment of the present invention. In the description to follow, like reference numerals are used to designate the same members as are used in the first embodiment. More specifically, numeral 1 denotes a moving platen; 2, a stationary platen; 3 and 4, dies; and 5, a nut fixing base fixed to the moving platen 1.

This embodiment differs from the first embodiment, which uses the ball nut 7 and the ball screw 8 forming a pair, mainly in that two pairs of ball nuts and ball screws for coarse and fine adjustment are used instead. A nut mounting plate 30 is fixed to the nut fixing base 5 by means of bolts or the like, and a fine-adjustment ball screw 32 is in engagement with a fine-adjustment ball nut 31 which is fixed to the nut mounting plate 30. The nut mounting plate 30 can slide along a guide surface 35 of a coarse-adjustment feed table 34, in a direction (from side to side as in FIG. 2) such that the dies 3 and 4 are opened or closed. A ball nut 37 for coarse adjustment is fixed to the coarse-adjustment feed table 34, and a ball screw 38 for coarse adjustment is in engagement with the ball nut 37. As the coarse-adjustment ball screw 38 rotates, the coarse-adjustment ball nut 37 and the coarse-adjustment feed table 34 move in the opening or closing direction for the dies 3 and 4. The coarse-adjustment feed table 34 is guided by a guide rod (not shown) or the like so as to be movable in the opening or closing direction for the dies 3 and 4. A braking system 40 is fixed to the base of the injection-molding machine, whereby a ball screw shaft 39, which is integral with the coarse-adjustment ball screw 38, is prevented from rotating. One end of the ball screw shaft 39 is separably coupled to a shaft 43 of a gear 42 by means of an electromagnetic clutch 41. The gear 42 meshes with a gear 45 which is driven by means of a motor 44.

A bearing plate 36 is fixed integrally on the coarse-adjustment table 34. A ball screw shaft 33, which is integral with the fine-adjustment ball screw 32, extends through the bearing plate 36, and is supported by means of a thrust bearing 46 which is attached to the bearing plate 36. One end of the ball screw shaft 33 is separably coupled to a spline shaft 49 by means of a clutch 48. A braking system 47, which is fixed to the bearing plate 36, is provided in operative relation with the ball screw shaft 33. A gear 50 is spline-coupled to the spline shaft 49. The gear 50 meshes with the gear 45 which is driven by the motor 44. The reduction ratio between the gears 45 and 50 is set to a larger value, and the gears 45 and 50 constitute a speed reducer. On the other hand, the gears 45 and 42 constitute transmission means with a rotational ratio of 1:1.

The operation of the mold clamping mechanism according to this second embodiment will now be described.

First, in the mold closing operation, the clutches 48 and 41 are disengaged and engaged, respectively, by means of the drive control device 100. Then, the braking system 47 is worked to lock the rotation of the fine-adjustment ball screw 32, while the braking system 40 is released. Subsequently, the motor 44 is driven in the mold closing direction, so that the ball screw shaft 39 and the coarse-adjustment ball screw 38 integral therewith are rotated at high speed through the medium of the gears 45 and 42 and the clutch 41. In the meantime, the fine-adjustment ball screw 32 is released from the spline shaft 49 by disengagement of the clutch 48, at the same time the ball screw is locked and prevented from rotating by the actuating braking system 47.

As the coarse-adjustment ball screw 38 rotates, the coarse-adjustment feed table 34, which is integral with the ball nut 37 in engagement with the ball screw 38, moves in the mold closing direction. Also, the ball screw shaft 33 and the fine-adjustment ball screw 32, which are enabled to move in unison with the feed table 34 by means of the bearing plate 36 and the braking system 47, move in the same direction. At the same time, the die, mounted on the moving platen 1 which is connected to a nut fixing base 5 and is movable with the nut mounting plate 30, moves at high speed in the mold closing direction. Then the spline shaft 49 and the clutch 48, along with the coarse-adjustment feed table 34, also move from right to left of FIG. 2.

When the die 3 reaches the die protection start position, the rotating speed of the motor 44 is lowered to the die protection speed. When the die 3 touches the die 4, the braking system 40 is actuated to lock the rotation of the coarse-adjustment ball screw 38, the clutches 41 and 48 are disengaged and engaged, respectively, and the braking system 47 is released. Thereupon, the rotation speed of the motor 44 is reduced by the speed reducer which is composed of the gears 45 and 50. Torque is transmitted to the fine-adjustment ball screw 32 through the spline shaft 49, the clutch 48, and the ball screw shaft 33, thereby causing the ball screw 32 to rotate. As the ball screw 32 rotates, the die 3 moves in the mold closing direction, urged by the nut mounting plate 30, the nut fixing base 5, and the moving platen 1, the plate 30 being integral with the ball nut 31 and slidable relatively to the coarse-adjustment feed table 34. Thus, dies 3 and 4 are clamped together. In this case, the rotatory force or torque of the motor 44 is enhanced by the speed reducer composed of the gears 45 and 50. Thus a larger clamping force is produced, whereby the clamps 3 and 4 are clamped fast. When the die 3 reaches the position where the set clamping force is produced, the braking system 47 is actuated to lock the rotation of the fine-and coarse-adjustment ball screws 32 and 38, the drive of the motor 44 is stopped, and the clutch 48 is disengaged.

Subsequently, in the mold opening operation, the braking systems 47 and 40 are first actuated and released, respectively, and the clutches 41 and 48 are engaged and disengaged, respectively. Then, the motor 44 is rotated in the mold opening direction, the coarse-adjustment ball screw 38 is rotated at the mold release speed, and the die 3 is moved in the mold opening direction. When the die 3 reaches an acceleration start position, the rotation of the motor 44 is accelerated. When the die 3 reaches a deceleration start position, the motor 44 is then decelerated. The coarse-adjustment feed table 34 reaches a position corresponding to a mold closing start position for the die 3, the braking system 40 is actuated, the clutch 41 is disengaged, the braking system 47 is released, and the clutch 48 is engaged. Thereupon, the fine-adjustment ball screw 32 rotates, so that the nut mounting plate 30 is driven relatively to the coarse-adjustment feed table 34 in the mold opening direction until the plate 30 reaches its mold clamping start position. Thus, the die 3 reaches the mold opening end position.

In the mold opening operation, the sequence of operation may be changed as follows. The nut mounting plate 30 is first returned to its mold clamping start position on the coarse-adjustment feed table 34, whereupon the coarse-adjustment feed table 34 is returned to its position corresponding to the mold opening end position.

When using a motor of any type other than a servomotor for the motor 44, the motor 44 must be controlled by detecting the respective positions of the coarse-adjustment feed table 34 and the nut mounting plate 30 by means of various sensors. When using a servomotor for the motor 44, on the other hand, the sensors need not be provided, this is because the displacement of the coarse-adjustment feed table 34 and that of the nut mounting plate 30 relative to the coarse-adjustment feed table 34 can be detected by means of a position detector attached to the servomotor.

According to the present invention, as described in connection with the first and second embodiments, the mold closing and opening speeds are increased, and a strong clamping force can be produced, without using any large-capacity motor. Since the motor used is not particularly large in capacity, a torque limit operation for limiting the output torque of the motor can be effected for die protection during the mold closing operation. More specifically, if a large-capacity motor with the maximum output torque of e.g., 100 tons is subjected to torque limit, the output torque obtained at the time of die protection is 1 ton at the minimum, since the torque limit resolving power is about 1/100. According to the present invention, however, the transmission means and the speed reducer are used alternatively, and transmission of the output torque of the motor to the moving platen traces power path for the mold opening and closing operations and another for the mold clamping operation. Thus, according to the invention, a general-purpose motor with the maximum output of about 2 or 3 tons may be used. If such a motor is subjected to torque limit, its output torque can be lowered to about 20 kg to 30 kg, so that an optimum die protection pressure can be obtained.

We claim:

1. A direct-pressure mold clamping apparatus for an injection-molding machine having a moving platen, comprising:
   conversion means including a rotating member and a rectilinear motion member movable in unison with the moving platen, said conversion means for converting rotary motion of said rotating member into rectilinear motion of said rectilinear motion member;
   a feed table movably supporting said moving platen;
   a motor having a drive shaft for driving the rotating member of said conversion means;
   a transmission coupled to the motor;
   a first ball screw/nut mechanism for course-adjustment having a course-adjustment nut coupled to said feed table and a course-adjustment ball screw driven by said motor through said transmission for moving the moving platen under a relatively high speed, low torque condition;
   a second ball screw/nut mechanism for fine adjustment having a fine-adjustment nut fixedly coupled to said moving platen and a fine-adjustment ball screw spline-coupled to a speed reducer and being driven by said motor for moving the moving platen under a relatively low speed, high torque condition;
   said transmission transmitting the rotation of said motor drive shaft to said course-adjustment ball screw;
   said speed reducer for reducing the rotational speed of said fine-adjustment ball screw while increasing the rotary force of said motor, and transmitting the rotary force of said motor to said fine-adjustment ball screw; and
   switching means for alternatively connecting said motor to said fine-adjustment ball screw and said course-adjustment ball screw through said transmission and said speed reducer, respectively.

2. A direct-pressure mold clamping apparatus according to claim 1, further comprising braking means for locking said rotating member.

3. A direct-pressure mold clamping apparatus according to claim 1 further comprising a sensor for detecting the position of the moving platen, and a control device for controlling said motor based on the position detected by the sensor, wherein said motor is a servomotor.

4. A direct-pressure mold clamping apparatus according to claim 1, wherein said switching means includes a first clutch for connecting and disconnecting said course-adjustment ball screw from the motor shaft, braking means for locking the rotation of said course-adjustment ball screw, a second clutch for connecting and disconnecting said fine-adjustment ball screw from the motor shaft, and braking means for locking the rotation of said fine-adjustment ball screw, said fine-adjustment nut being axially slidable with respect to said coarse-adjustment nut and movable in unison with said moving platen.

5. A mold clamping apparatus having a movable die fixed to a movable platen and a stationary platen, the apparatus comprising:
   a motor having a rotary power output shaft;
   a feed table movably supporting the movable platen;
   a first ball nut supported on the feed table;
   a first ball screw threadedly engaging the first ball nut and having a rotatably supported integrally formed shaft driven by the motor to move the movable platen and the feed table in unison under a relatively high speed, low torque condition;
   a second ball nut fixedly connected to the movable platen;
   a second ball screw threadedly engaging the ball nut and having a rotatably supported integrally formed shaft driven by the motor for moving the movable platen relative to the feed table under a relatively low speed, high torque condition;
   a transmission for transmitting power from the motor shaft to the first ball screw shaft;
   a speed reducer for transmitting power from the motor shaft to the second ball screw shaft at a reduced rotational speed and increased torque; and
   switching means for alternatively connecting the transmission and the speed reducer to the motor shaft.

6. A mold clamping apparatus according to claim 5, wherein the transmission comprises a first gear connected to the motor shaft, a second gear meshing with the first gear and having a shaft detachably connected to the first ball screw shaft.

7. A mold clamping apparatus according to claim 6, wherein the speed reducer comprises a speed reducer gear meshing with the first gear, a splined shaft detachably connected to the second ball screw shaft and supporting the speed reducer gear and being axially movable relative to the speed reducer gear.

8. A mold clamping apparatus according to claim 7, wherein the switching means comprises:
   a first clutch between the first ball screw shaft and the second gear shaft, and a second clutch between the second ball screw shaft and the splined shaft, and a controller for alternatively outputting switching signals to the first and second clutches.

* * * * *